United States Patent [19]
Davis et al.

[11] Patent Number: 5,105,784
[45] Date of Patent: Apr. 21, 1992

[54] ROTARY VALVE AND SYSTEM FOR DURATION AND PHASE CONTROL

[75] Inventors: Richard S. Davis, Romeo; Jordan R. Lee, Sterling Heights; Glen R. MacFarlane, Clarkston, all of Mich.

[73] Assignee: General Motors Corporation, Detroit, Mich.

[21] Appl. No.: 681,596

[22] Filed: Apr. 8, 1991

[51] Int. Cl.$^5$ ............................ F01L 7/02; F02D 9/16
[52] U.S. Cl. .................................. 123/337; 123/405; 123/190.2
[58] Field of Search ............... 123/26, 52 MF, 80 BA, 123/90.15, 336, 337, 402, 405, 190 A

[56] References Cited

U.S. PATENT DOCUMENTS

| | | | |
|---|---|---|---|
| 2,110,754 | 3/1938 | Alston | 123/76 |
| 2,141,428 | 12/1938 | Carroll | 123/190 A |
| 4,163,438 | 8/1979 | Guenther et al. | 123/190 A |
| 4,354,459 | 10/1982 | Maxey | 123/80 BA |
| 4,484,543 | 11/1984 | Maxey | 123/80 BA |
| 4,738,233 | 4/1988 | Hitomi et al. | 123/190 A |
| 4,802,452 | 2/1989 | Kanesaka | 123/376 |
| 4,890,582 | 1/1990 | Schatz et al. | 123/26 |
| 4,928,639 | 5/1990 | Schatz | 123/52 MF |
| 4,932,378 | 6/1990 | Hitomi et al. | 123/432 |
| 4,991,547 | 2/1991 | Davis et al. | 123/52 MF |

FOREIGN PATENT DOCUMENTS

| | | |
|---|---|---|
| 342893 | 11/1989 | European Pat. Off. |
| 344780 | 12/1989 | European Pat. Off. |
| 0160514 | 9/1983 | Japan . |
| 1241191 | 7/1971 | United Kingdom . |
| 2215817 | 6/1989 | United Kingdom . |

Primary Examiner—Willis R. Wolfe
Attorney, Agent, or Firm—Gordon F. Belcher

[57] ABSTRACT

An internal combustion engine has a stator passage leading to a cylinder. An intake poppet valve is disposed between the cylinder and stator passage, and a rotary valve adjoins the opposite end of the stator passage. The rotary valve has a rotor with an elongated tapered rotor passage partially in registration with the stator passage. The rotor is driven by the crankshaft and is adjustable in phase to vary the time of opening and closing of the rotary valve, and is axially shiftable to vary the valve opening duration. A control system responsive to engine speed and load independently varies the rotary valve phase and duration for optimum engine operation.

2 Claims, 2 Drawing Sheets

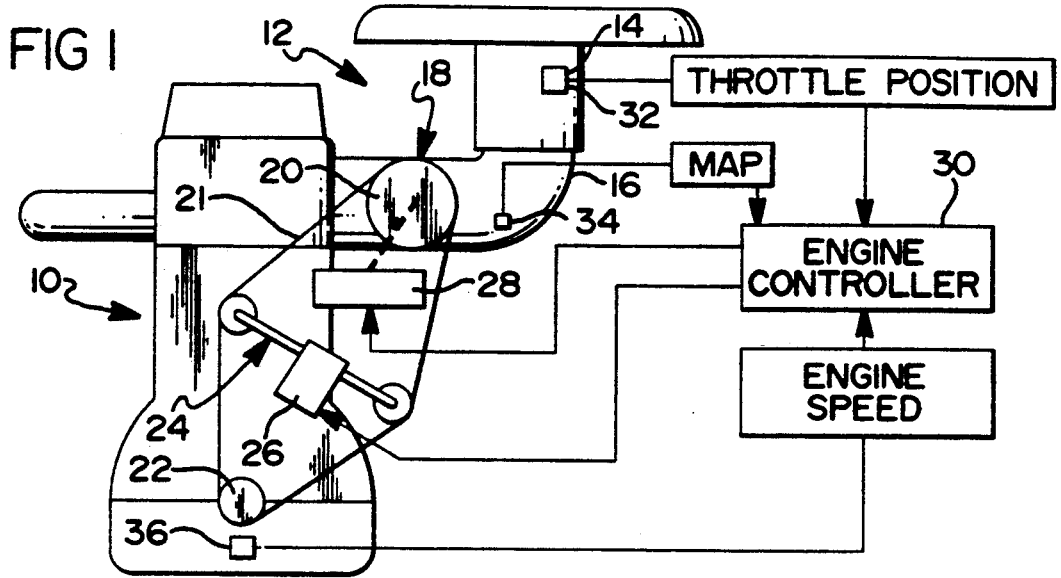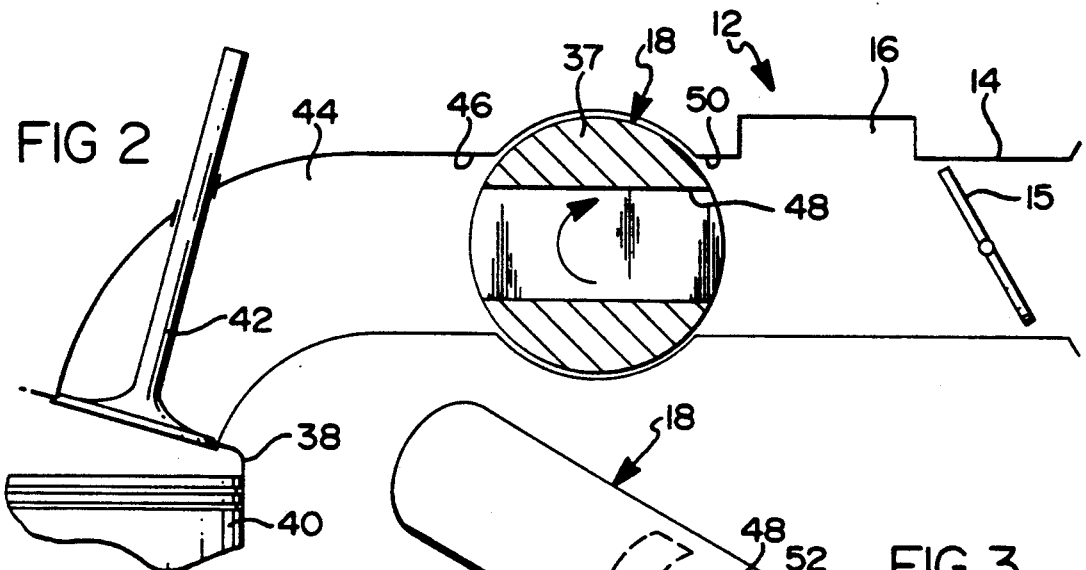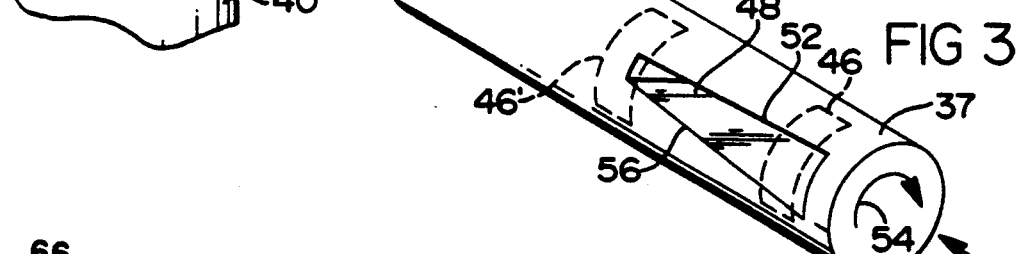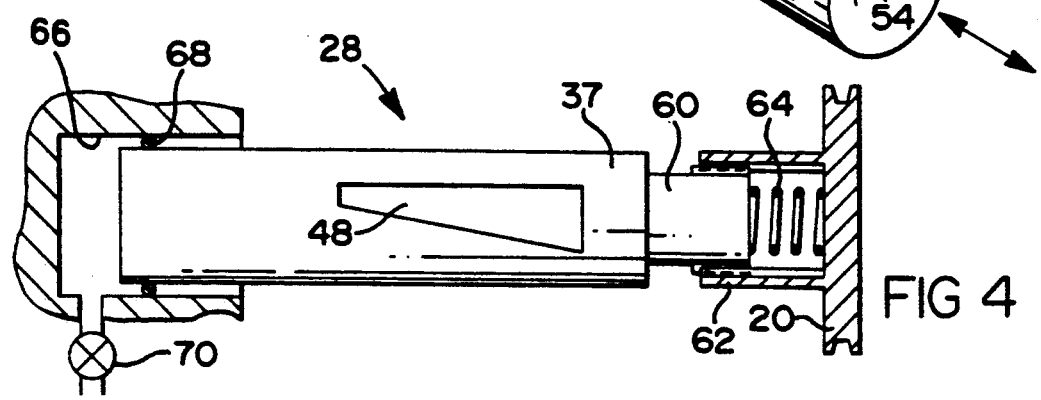

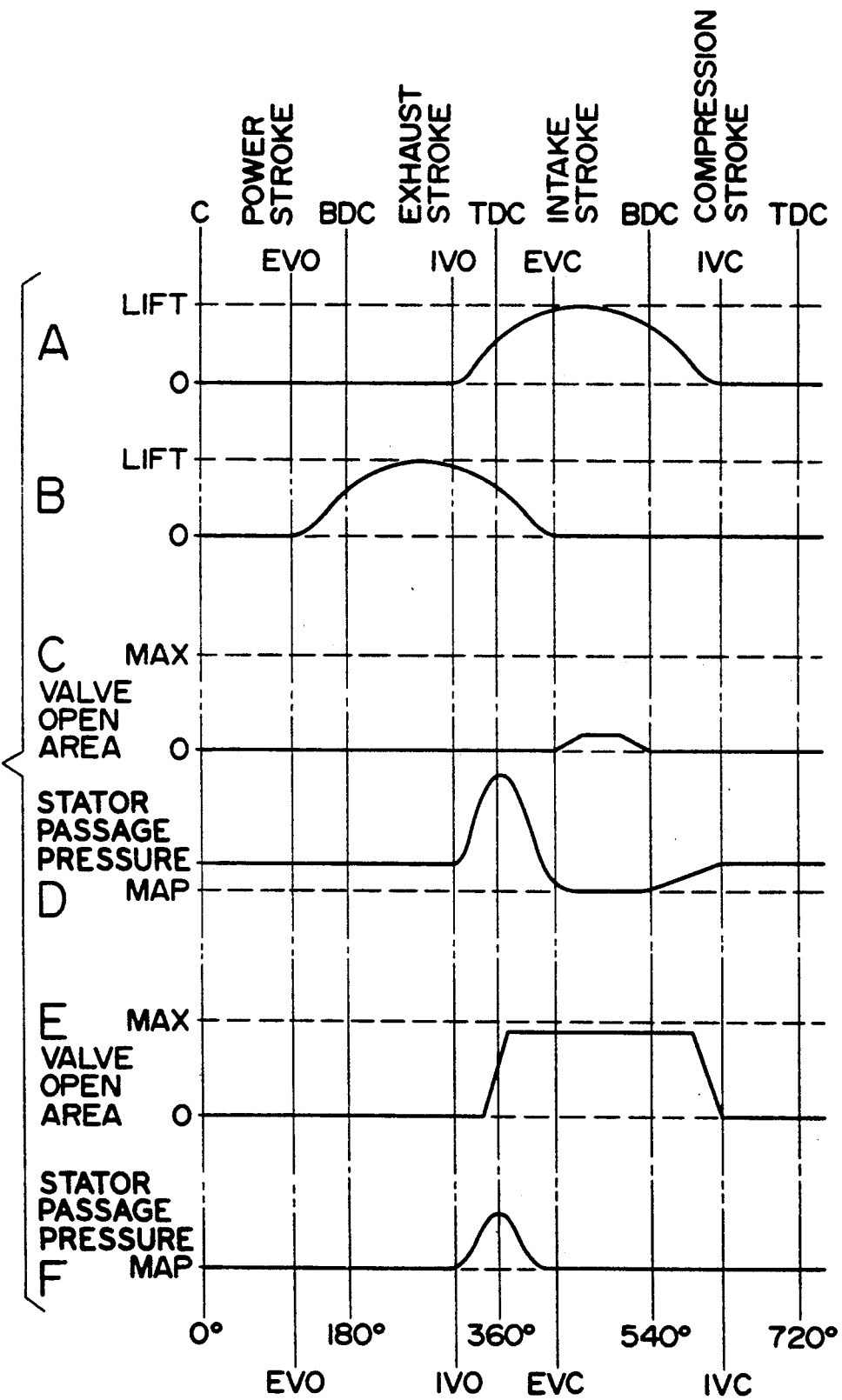

ROTARY VALVE AND SYSTEM FOR DURATION AND PHASE CONTROL

TECHNICAL FIELD

This invention relates to an induction control means for an internal combustion engine and particularly to a rotary valve with independently controlled phase and duration.

BACKGROUND

To improve the performance of four cycle internal combustion engines, it has been proposed to incorporate a reed valve in the induction passage of each cylinder in series with the intake poppet valve. The benefits of such reed valves include the ability to broaden the torque range of the engine (by producing higher torque at lower engine speeds with limited effect on high speed power), improving idle quality, and reducing light load fuel consumption. The reed valves generally have a cantilever beam design which can cause a pressure drop and an associated loss in flow which can result in loss of power and/or efficiency under certain engine operating conditions. Also, the continuous flexing of the reed petal can limit its fatigue life. Moreover, a reed petal structure able to withstand large pressures downstream of it can limit the engine performance improvements resulting from the reed valve, and increase the cost of the reed valve.

To obtain the advantages resulting from reed valves, an alternative approach is to use variable valve timing. This requires the lift, timing, and/or duration of the intake and/or exhaust valves to be changed based on engine operating conditions and comprises manipulation of the actual valve train which can involve relatively high forces and loads on the valve train. Designs to accomplish such operations can lead to high levels of cost and complexity. Further, to obtain all the benefits of a reed valve induction system, the variable valve timing system must vary both the duration and phasing of the intake valve opening which presents a technological challenge.

Rotary valves in induction systems can be used alone or in series with conventional poppet valves to offer adjustability to the intake control. A rotary valve in the intake manifold may be driven by the engine to permit periodic flow in phase with the periodic intake flow into the respective cylinder. In place of the standard poppet valve, an axially shiftable rotary valve with shaped ports can be used to vary the duration of the rotary valve opening. Also, a rotary valve can be driven from the crankshaft in phase with the crankshaft, with the phase being adjustable according to load conditions. Furthermore, instead of a poppet valve, an axially shiftable rotary valve with a valve port tapered in a manner to change both the phase and duration of the rotary valve opening upon axial shifting can be used. The amount of phase shift relative to the amount of duration change is fixed according to the valve port design so that the phase and duration are interdependent.

SUMMARY OF THE INVENTION

It is therefore an object of the invention to provide an induction system with a rotary valve having effective independent control of both duration and phasing of the valve opening. It is a further object to provide such a system with reduced flow losses and increased durability in comparison to a reed valve induction system. Another object is to provide such a rotary valve for an induction system with minimal valve operation forces. Still another object is to provide such a rotary valve in series with a poppet valve for duration and phase control of the rotary valve opening.

The present invention provides a rotary valve for controlling the air flow to a cylinder of an internal combustion engine, said rotary valve comprising a stator passage leading to the cylinder for supplying air thereto, a rotor having a longitudinal axis, said rotor being mounted adjacent to the end of said stator passage which is opposite to the cylinder so that said axis is transverse to the end of said stator passage adjacent to said rotor, said rotor having a rotor passage, said rotor being adapted to rotate about said axis enabling periodic registration of said rotor passage with said stator passage, said registration constituting a valve opening, said rotor being further adapted for shifting along said axis to vary the orientation between said rotor and stator passages, said stator and rotor passages being shaped so that the duration of said valve opening varies with axial shifting of said rotor, means for axially shifting said rotor to control the duration of said valve opening; means for rotating said rotor in accordance with an intake stroke of the engine, said means for rotating including means for varying the phase of said valve opening with respect to the intake stroke, said means for rotating thereby enabling coordination between the intake stroke and said valve opening.

These and other features and advantages of the invention will be more fully understood from the following description of certain specific embodiments of the invention taken together with the accompanying drawings.

BRIEF DRAWING DESCRIPTION

In the drawings:

FIG. 1 is a schematic view of a control system incorporating a rotary valve according to the invention connected to an engine;

FIG. 2 is a schematic cross-sectional view of the rotary valve of FIG. 1 in an induction passage;

FIG. 3 is a perspective view of the rotor of the rotary valve of FIG. 2;

FIG. 4 is a cross-sectional view of the rotor of the rotary valve of FIG. 1 showing the axial shift actuator; and FIG. 5 is a graphical illustration of the openings of the intake and exhaust poppet valves, and the rotary valve, and the intake port pressures, relative to the crankshaft rotation for two different operating conditions of the engine of FIG. 1.

Corresponding reference characters indicate corresponding parts throughout the several views of the drawings.

DETAILED DESCRIPTION

Referring to the drawings, and in particular FIG. 1, an internal combustion engine 10 having a plurality of cylinders includes an air induction passage 12 comprising in part a throttle body 14, an intake plenum or manifold 16 and a rotary valve 18. The rotary valve 18 is capable of rotation and axial movement. A pulley 20 on the valve 18 is driven via a belt 21 from a crankshaft pulley 22. The ratio of the pulley 20,22 sizes determines the rate of valve 18 rotation and is selected to rotate the valve one for each four or eight crankshaft rotations.

An idler pulley assembly 24 controlled by an actuator 26 provides the ability to shift the phase of the rotation of the valve 18 relative to crankshaft rotation. Similarly, a valve axial shift actuator 28 provides the ability to control the axial position of the valve 18. An engine controller 30, which is typically a microprocessor based controller, has inputs from a throttle position sensor 32, a manifold absolute pressure sensor 34, an engine speed sensor 36 and possibly other input devices, and determines fuel control and spark control and also regulates the phase shift actuator 26 and the axial shift actuator 28.

FIG. 2 shows a cross section of the rotor 37 of the valve 18 and the intake passage 12, as well as a throttle 15, a portion of a cylinder 38 having a piston 40, an intake valve comprising an intake poppet valve 42 at the intake port of the cylinder, and a stator passage 44 between the rotary valve 18 and the poppet valve 42 which contains a trapped volume of gases when both valves are closed The size and shape of the opening 46 of the stator passage 44 adjacent the rotor 37, as well as the size and shape of the rotor passage 48 through the rotor 37, determines the extent of the rotary valve 18 opening during each half revolution of the rotor 37, and the effect of axially shifting the rotor 37. The opening 50 of the plenum 16 adjacent the rotor 37 may also be a limiting factor in defining the rotary valve 18 opening. However, for the purposes of the ensuing description of valve operation, it is assumed that the opening 46 coupled with the passage 48, as modified by the phase and shift actuators 26,28 determine the phase, flow area and duration of rotary valve 18 opening. As shown, the rotor passage 48 extends through the rotor 37 to define two diametrically opposed valve openings. By rotating the rotor 37 one half revolution for each two crankshaft revolutions, the rotary valve 18 will be opened each time the intake poppet valve 42 is opened. If, however, the valve passage 48 is formed with openings each 90° around the rotor 37, only one fourth rotor 37 revolution is required for each two crankshaft revolutions. This would result in lower rotational velocities and thus lower frictional losses.

FIG. 3 shows the rotor 37 with the passage 48, and a dashed-line representation of the stator opening 46 imposed on the rotor. While the stator opening 46 is shown as a generally rectangular shape, other shapes may be used to determine, in conjunction with the passage 48 shape, the region of common opening for a given rotor 37 position. The passage 48 is depicted as an axially elongated hole bounded by a leading edge 52 (for clockwise rotor 37 rotation as indicated by the arrow 54) and a trailing edge 56 which are slanted to define a narrow opening at one end and a wide opening at the other end. When the rotor 37 is axially positioned with the wide end of the passage 48 in registry with the opening 46, as shown in FIG. 3, the valve 18 opening is at its maximum and when the rotor is positioned with the narrow end of the passage 48 in registry with the opening 46, the valve 18 opening is at its minimum. If either the leading edge 52 or the trailing edge 56 of the passage 48 is parallel with the rotor 37 axis, the phase of the valve 18 opening or closing, respectively, would not change with axial adjustment. However, in order to change the valve 18 opening duration via axial shift of the rotor 37, the phase of valve 18 opening or closing, or both, must change as a result of the axial shift. Although the leading and trailing edges 52,56 are shown to be linear, that is not a necessary condition. Thus, while the purpose of axial shifting of the rotor 37 is primarily to change the valve 18 opening duration, phase change, which is dependent on the shape of the passage 48 is also taking place. The passage 48 shape may be chosen to provide optimum valve operation for two conditions, e.g. high speed and high load for the wide end of the passage 48, and low speed and low load for the narrow end. While these are common operating conditions, there are others such as high speed, low load and low speed, high load for which neither the wide end nor narrow end of the passage 48 are optimal. Thus the ability to change the phase of the valve 18 opening independently of the duration is desirable.

The ability to control load at an idle condition is increased by axially translating the rotor 37 so that the rotor passage 48 and the stator passage (shown at 46') barely overlap. This is useful since controlling load by adjusting the phase of the valve 18 opening can cause problems with high residuals or excessive pumping losses.

Referring to FIG. 1, it can be seen that the lateral position of the idler pulley assembly 24 can be adjusted by operation of the phase shift actuator 26 under control of the engine controller 30. When the idler pulley assembly 24 shifts in either direction, the rotor 37 rotates in a corresponding direction up to several degrees relative to a given crankshaft position.

FIG. 4 shows one example of the axial shift actuator 28. The actuator 28 comprises two parts: first, a splined shaft 60 on one end of the rotor 37 is drivingly coupled in a cooperating hub 62 of the drive pulley 20 and a spring 64 in the hub biases the rotor 37 in a direction away from the pulley 20; second, a cylinder 66 formed in the engine 10 head or manifold 16 receives the other end of the rotor 37 which acts as a piston slidable and rotatable within a seal 68, and hydraulic fluid admitted to the cylinder 66 under controlled pressure counters the force of spring 64. The fluid pressure is controlled by a valve 70 responsive to the engine controller 30 to axially position the rotor 37 anywhere in its range of movement. The valve 70 may be axially adjustable to two or more discrete positions or continuously adjustable to any position.

Thus, both the phase and axial position of the rotor 37 are independently controlled by the signals from the controller 30 which is programmed to select the optimum combination of duration and phase for any engine 10 operating condition. Separate signals from the controller 30 to the actuators 26,28 are each a function of engine 10 speed and load, and the actuators are energized by the signals to coordinate the axial shifting and rotary phase movement of the rotor 37 to provide the proper combination of phase and duration adjustments. The opening point of the rotary valve 18 is predominately controlled by load and the closing is predominately controlled by speed. The shapes of the passage 48 and opening 46, as well as the desired result, determine the required control signals.

Alternate arrangements are possible for controlling the duration and phasing of the rotary valve 18. Both speed and load can be used to control the valve 18 via a combination of governor weights driven by the engine 10 and a vacuum actuator responsive to the intake plenum 16 pressure. A precise control strategy could be implemented using closed-loop feedback control based on the pressure in the stator passage 44. The stator passage 44 pressure, especially during overlap between the intake poppet valve 42 and exhaust poppet valve, and during the time when the intake poppet valve is closed, can be used to determine if the position of the rotary valve 18 is optimized or if adjustment is required. For example, the ideal time during the engine cycle for the rotary valve 18 to close is during the time when the flow through the rotary valve toward the cylinder 38 reverses direction.

While the rotary valve 18 could be built to operate without the use of an intake poppet valve 42, it would be subject to the effects of combustion temperatures and pressures. The intake poppet valve 42 therefore protects the rotary valve 18 from combustion effects to simplify the design and lower the expense of the rotary valve as well as to improve combustion chamber design for better emissions and fuel economy. The intake 42 and exhaust poppet valves are timed to open early and close late, and thus allow a wide range of phasing of the rotary valve 18.

The graphs A and B of FIG. 5 illustrate the openings of intake 42 and exhaust poppet valves as a function of crankshaft rotation, graphs C and D illustrate the corresponding rotary valve 18 opening area and stator passage 44 pressure for a low engine speed and load, and graphs E and F illustrate the rotary valve opening area and stator passage pressure for a high engine speed and load. Thus, as shown in graphs A and B, the intake poppet valve 42 opens (IVO) well before top dead center (TDC) of the piston 40 and the exhaust poppet valve closes (EVC) well after TDC to provide a large valve overlap area. Also, the intake poppet valve 42 closes (IVC) well after bottom dead center (BDC) of the piston 40. If the rotary valve 18 were not present, the intake 42 and exhaust poppet valve timing would cause substantial flow reversions from the cylinder 38 into the stator passage 44 during valve overlap (especially during low engine loads) and during the start of the compression stroke of the piston 40 (especially during low engine speeds). These reversions, if permitted, would result in reduced light load combustion stability due to high dilution of the incoming charge in the stator passage 44 and reduced low speed torque due to decreased effective compression ratio in the cylinder 38. The exhaust valve opens (EVO) during the power stroke of the piston 40.

For low engine speeds and loads, the rotary valve 18 opens late, near EVC, and closes early, near BDC, as shown in graph C. The pressure in the stator passage 44, shown in graph D, increases rapidly to a high value during the time of valve overlap, reaching a peak near TDC. The pressure increase is highly dependent on engine load and is due to exhaust pressure tending to cause exhaust gas to flow from the cylinder 38 into the stator passage 44. The rapid decrease in stator passage 44 pressure during valve overlap is due to the increase in cylinder 38 volume during the intake stroke of the piston 40. The closure of the rotary valve 18 during the time when the stator passage 44 pressure is increased limits the flow of exhaust gas beyond the stator passage into the plenum 16 thereby limiting dilution of the air therein. The location of the rotary valve 18 near the intake poppet valve 42 limits the volume of the stator passage 44 thereby limiting the amount of exhaust gas flow therein. The early closing of the rotary valve 18 limits flow reversal from the cylinder 38 into the stator passage 44 caused by the compression stroke of the piston 40 during the time when the intake poppet valve 42 is open which is primarily dependent upon engine speed.

For a high engine speed and load, shown in graphs E and F, the flow reversions into the stator passage 44 due to valve overlap are smaller due to the increased pressure in the stator passage 44, and the rotary valve 18 can therefore open early, near IVO. The charge of air flowing into the cylinder 38 has a high velocity so that, after BDC and before IVC, the inertia of the air charge resists flow reversal from the cylinder 38 into the stator passage 44. The rotary valve 18 can therefore close late, near IVC, to produce a large total flow area.

The graphs of FIG. 5 are examples of a low engine speed and load (Graphs C and D) and a high engine speed and load (Graphs E and F). For intermediate engine speeds and loads, the optimal rotary valve openings and durations are different. For example, during low engine loads and high engine speeds, the rotary valve 18 opens late, near EVC, and closes late, near IVC. During high engine loads and low engine speeds, the rotary valve 18 opens early, near IVO, and closes early, near BDC. Control of the rotary valve 18 opening duration being independent from control of the rotary valve opening phasing facilitates the optimal phasing of the rotary valve opening and closing for a wide variety of engine load and speed combinations. Use of an electronic engine controller 30 facilitates adjustment of the rotary valve 18 opening duration and phasing during engine operation. This is accomplished without imposing additional forces and loads on the valve train. Also, the pressure drop in the flow produced by the rotary valve 18 can be controlled.

It will thus be seen that the rotary valve 18 with independent adjustment of opening phasing and duration is advantageously included in a flexible engine control system to optimize engine performance during various engine operating conditions. A number of variations may be made and features may be added to the rotary valve 18 and its control system. For example, the rotor 37 may contain passages 48 spaced along its length for controlling flow through a plurality of stator passages 44 leading to respective cylinders 38. Also, if the rotary valve 18 can carry a sufficiently wide range of flows and has a sufficiently high resolution (i.e., can sufficiently control the flow through it, especially during low flows), then the rotary valve can be used for engine load control thereby eliminating the need for an additional throttle 15. This can also improve throttle response, transient emissions, and idle stability by reducing manifold filling effects on the flow into the cylinder 38 (i.e., the effects due to the time it takes to alter, and in other respects control, the conditions inside the plenum 16 due to its volume).

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property of privilege is claimed are defined as follows:

1. A rotary valve for controlling the air flow to a cylinder of an internal combustion engine, said rotary valve comprising:
   a stator passage leading to the cylinder for supplying air thereto, a rotor having a longitudinal axis, said rotor being mounted adjacent to the end of said stator passage which is opposite to the cylinder so that said axis of transverse to the end of said stator passage adjacent to said rotor;

said rotor having a rotor passage;

said rotor being adapted to rotate about said axis enabling periodic registration of said rotor passage with said stator passage, said registration constituting a valve opening, said rotor being further adapted for shifting along said axis, said stator and rotor passages being shaped so that the duration of said valve opening varies with axial shifting of said rotor, means for axially shifting said rotor to control the duration of said valve opening;

means for rotating said rotor in accordance with an intake stroke of the engine, said means for rotating including means for varying the phase of said valve opening with respect to the intake stroke, said means for rotating thereby enabling coordination between the intake stroke and said valve opening, wherein an intake valve is disposed between the cylinder and said stator passage to control flow between them, said intake valve being timed to open before the intake stroke and close after the intake stroke, and wherein the duration of said rotary valve opening occurs entirely while said intake valve is open.

2. A rotary valve for controlling the air flow to a cylinder of an internal combustion engine, said rotary valve comprising:

a stator passage leading to the cylinder for supplying air thereto, a rotor having a longitudinal axis, said rotor being mounted adjacent to the end of said stator passage which is opposite to the cylinder so that said axis is transverse to the end of said stator passage adjacent to said rotor, said rotor having a rotor passage, said rotor being adapted to rotate about said axis enabling periodic registration of said rotor passage with said stator passage, said registration constituting a valve opening, said rotor being further adapted for shifting along said axis, said stator and rotor passages being shaped so that the duration of said valve opening varies with axial shifting of said rotor, means for axially shifting said rotor to control the duration of said valve opening;

means for rotating said rotor in accordance with an intake stroke of the engine, said means for rotating including means for varying the phase of said valve opening with respect to the intake stroke, said means for rotating thereby enabling coordination between the intake stroke and said valve opening, and an engine controller adapted to sense the engine speed and load, and to produce first and second control signals each being a function of engine speed and load, said means for axially shifting being connected to said engine controller and adapted to sense said first control signal, said means for axially shifting being further adapted to axially shift said rotor in response to said first control signal to control the duration of said valve opening, said means for rotating being connected to said engine controller and adapted to sense said second control signal, said means for rotating being further adapted to rotate said rotor in response to said second control signal to control the phase of said valve opening.

* * * * *